United States Patent [19]

Capute

[11] 3,901,707

[45] Aug. 26, 1975

[54] PHOTOGRAMMETRIC METHODS FOR THE PREPARATION OF ANAGLYPHIC, ORTHOPHOTOGRAPHS

[75] Inventor: Milton C. Capute, Beaver, Pa.

[73] Assignee: Euthenics Systems Corporation, Beaver, Pa.

[22] Filed: Dec. 7, 1973

[21] Appl. No.: 422,772

[52] U.S. Cl. .................. 96/40; 96/27 R; 96/27 E; 355/22; 355/54; 354/124; 156/59
[51] Int. Cl.² .......................................... G03C 9/00
[58] Field of Search ............ 283/34, 35; 35/41, 43, 35/44; 96/40, 27 R, 27 E; 355/22, 54; 354/124; 156/59

[56] References Cited
UNITED STATES PATENTS

| | | | |
|---|---|---|---|
| 3,486,820 | 12/1969 | Blachut et al. | 355/22 |
| 3,583,809 | 6/1971 | Dubuisson | 355/22 |
| 3,602,592 | 8/1971 | Collins | 355/22 |
| 3,663,103 | 5/1972 | Collins | 355/22 |
| 3,732,008 | 5/1973 | Lasalle | 355/22 |
| 3,785,731 | 1/1974 | Knauf | 355/22 |

*Primary Examiner*—Norman G. Torchin
*Assistant Examiner*—Edward C. Kimlin
*Attorney, Agent, or Firm*—Thomas C. Wettach; Arland T. Stein

[57] ABSTRACT

Photogrammetric methods are provided for the preparation of anaglyphic orthophotographs in which first and second diapositives having overlapping image areas of at least 55 to 65 percent are positioned above a vertically adjustable plane in spaced apart relation and in a planar attitude corresponding to the attitude of the focal plane of the camera when taken. First and second coloured high intensity light beams are projected through the first and second diapositives, respectively, to generate first and second coloured image beams. The first and second image beams representing an image corresponding to a selected object distance from the focal plane of the camera are focused to intersect at a point. The vertically adjustable plane is then adjusted so that said point of intersection lies in the plane. Colour photosensitive material is then positioned in the vertically adjustable plane and the images from the first and second image beams are exposed thereon. The exposed material is thereafter developed to provide an anaglyphic orthophotograph wherein the first and second colour images are separated by a distance proportional to their relative vertical object displacement.

Methods for preparing colour and infrared orthophotographs are disclosed in which said steps are modified by using colour negatives and or colour diapositives. Further, the photosensitive material is exposed in segments while the vertically adjustable plane is continuously adjusted during exposure to provide superposition of selected images, and printing one of said images.

12 Claims, 1 Drawing Figure

PATENTED AUG 26 1975
3,901,707
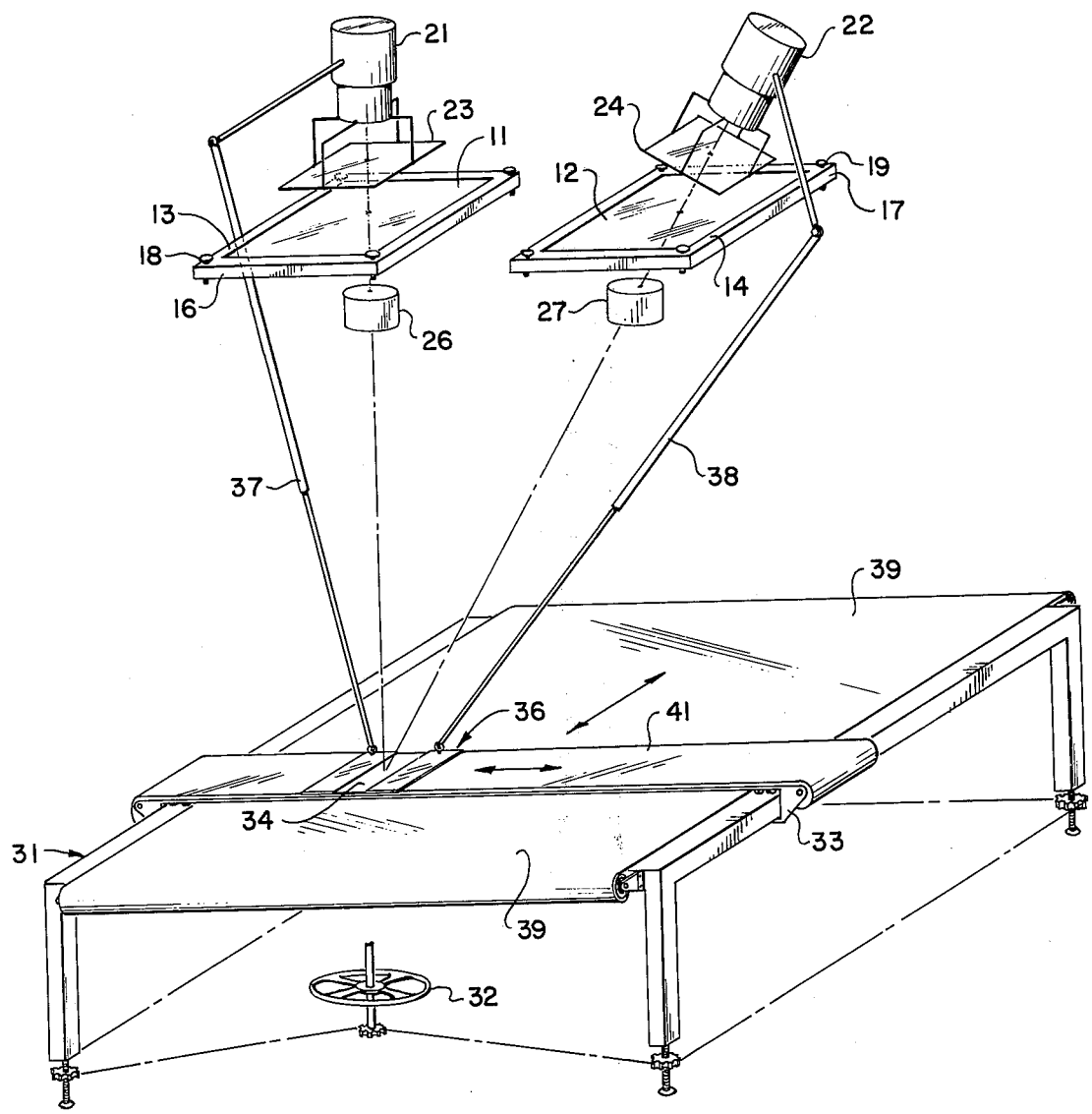

PHOTOGRAMMETRIC METHODS FOR THE PREPARATION OF ANAGLYPHIC, ORTHOPHOTOGRAPHS

FIELD OF THE INVENTION

The present invention relates to a method of orthophotogrammetry, and, in particular, to a method for the preparation of and to an anaglyphic orthophotograph. The present invention also relates to a method for the preparation of and to colour and infrared orthophotographs.

BACKGROUND OF THE INVENTION

Photogrammetry has been well known and used for many years and has become increasingly important as a cartographic method. Of particular importance and predominance is the utilization of aerial photogrammetry where a series of overlapping aerial photographs are taken from an aircraft flying in a fixed direction and altitude. Since the optical axis of an aerial photograph is usually tilted a small amount as a result of flight conditions, there is a distortion due to tilt. If perceivable, the distortion may be eliminated by taking a picture of the photograph with a camera having the optical axis of the lens tilted with respect to the plane of the photograph. However, because all image points are not at the same elevation and not in line with the optical axis, even if vertical, they will have a relative displacement which makes the aerial photograph unacceptable as a scale map. Various methods have been attempted to overcome this relative displacement, known as relief displacement.

One system for using aerial photographs in the preparation of scale rectified maps comprises the floating-mark system. In this photogrammetric method, a pair of overlapping aerial photographs is positioned on a plotting instrument which projects each image onto a surface. The plotting instrument incorporates a drawing attachment which is in direct line with a pair of dots or marks located in the center of a space model receiving platform. In order to obtain the proper perspective of the aerial photographs, the stereoscopic pair is arranged in a preselected fixed position which provides a three-dimensional view when viewed through a stereoscopic viewing instrument. Vertical adjustments can be made to the surface on which the images are projected which has the effect of moving one mark relative to the other. These adjustments are used to eliminate the vertical parallax from the projected space model. Thus, when all vertical parallax is removed the floating marks appear as one mark when placed at the proper image intersecting point. Since the floating mark is in line with the plotting instrument, planimetric detail can be traced and a contour line corresponding to a given elevation is made by locking the vertical adjustments at a predetermined position and maintaining the floating mark in apparent contact with the ground during tracing.

Recently, this method has been adapted to the preparation of orthophotographs which permit a scale-rectified photographic image of a portion of the earth's surface. The orthophotograph is produced by a method that removes the effects of tilt, relief and many of the lens apparations from the aerial photographs taken of the terrain. The orthophotographic image area may include contours of terrain elevations to produce an orthophotomap having an accuracy equal not only to the best topographical mapping techniques but within specifications of the national standards of map accuracy.

Generally, the preparation of an orthophotograph utilizes direct double-projection plotting instruments that establish spatial intersection points of light rays issuing from a pair of photographs, or stereoscopic pair. The ray intersections establish an incremental area at model scale of the photograph terrain. In this manner, space can be incrementally formed at a scale of the map to be exposed. The two images of an object point are projected onto a screen whose position is adjustable in the plane of the photograhic table (X, Y plane) and in height (or vertical Z plane). While exposing the space defined by a pair of photographs in the X, Y directions, the height of the table is continuously adjusted to maintain superposition of the images on a small viewing screen such as the floating-mark, and a continuous photographic recording made.

The orthogonal photographic recording of the terrain imagery, an orthophotograph, represents the terrain as though the photograph had been taken at a point located at infinity. While orthophotographs provide scale rectified images permitting measurement therebetween with high accuracy, relative elevations are not readily apparent. That is, without the addition of contours of terrain elevations to the orthophotographic image area, orthophotomapping, the orthophotograph does not provide the information for visual determination of relative image area elevation. Furthermore, orthophotographs as well as orthophotomaps have only been produced as black and white (half tones) photographs. There are many instances, however, where accurate colour orthophotographs would provide highly useful and desirable information.

Accordingly, it is an object of the present invention to provide a method for preparation of orthophotographs which present on visual observation to a viewer a rectified visual three-dimensional image. In particular, it is an object of the invention to provide an ortho-anaglyph which upon viewing through a pair of filters provides a stereoscopic or three-dimensional effect. It is a further object of the invention to provide a method for the preparation of colour infrared orthophotographs.

SUMMARY OF THE INVENTION

The present invention is directed to a method for the preparation of anaglyphic orthophotographs which when viewed with glasses having optical transparency associated with the anaglyphic images a three-dimensional image as presented to the viewer. The anaglyphic orthophotographs of the present invention are scale rectified not only as between images but also as between relative object distances from the focal plane of the camera, such as terrain elevations. Therefore, the anaglyphic orthophotographs and mosaics assembled from a plurality of these photographs are particularly well adapted and useful for reconnaissance and preliminary highway studies, utility line locations, urban development and environmental studies, and the like.

Generally, the present invention provides a method for the preparation of an anaglyphic orthophotograph from first and second diapositives (a transparent glass plate with a photographic sensitive surface emulsion to which the aerial negative image is transferred) having overlapping image areas of at least 55–65 percent. Generally, the method comprises positioning a first and second diapositive above a vertically adjustable plane in spaced apart relation with respect to each other and in a planar attitude corresponding to the attitude of the vocal plane of the camera when each of the respective diapositives was taken. A colour photosensitive material is positioned in the vertically adjustable plane below the diapositives. Thereafter, a high intensity first colour beam is projected through at least a portion of the first diapositive to generate a first image beam and a second high intensity colour beam is projected through at least a corresponding portion of the second diapositive to generate a second image beam. The first and second image beams are focused to intersect at a point. Preferably, the vertically adjustable plane is positioned so that the point of intersection of the image beam lies in a plane only for the image on the diapositive corresponding to the object closest to the vocal plane of the camera at the time said diapositives were taken. However, other image planes may be used depending upon the relative object displacements. Adjacent portions of the photosensitive material are thereafter exposed to the image beams while simultaneously projecting said high intensity beams through corresponding adjacent portions of the diapositives.

More specifically, the method of the present invention is advantageously practiced utilizing existing orthophotographic equipment such as a SFOM Orthophotographic Unit, manufactured by Matra, France. Preferably, a pair of diapositive overlapping aerial photographs are used in which the overlap between adjacent photographic image areas comprises approximately 55 to 65 and preferably 60 percent. The two diapositives are spaced apart on projecting tables which are positioned above a vertically adjustable planar table. The spaced apart diapositives are vertically and horizontally adjusted to correct for any variations arising from the original attitude and/or altitude of the aircraft at the time the photographs were made.

A pair of high intensity light sources are used to project the photographic images onto the table. Positioned between one of said light sources and its associated diapositive is a red filter and positioned between the other light source and its associated diapositive is a green filter to project the respectively coloured lights through each of its associated diapositive. Preferably, an apodizing filter is positioned above each diapositive to obtain uniform light projection during the subsequent scan in which the photographic material is exposed.

Colour sensitized photographic material is positioned on the table and masked for an exposure slot which is adapted to continuously scan in the X, Y plane of the unexposed paper to effect the photographic recording. Generally, the exposure slot is between 5 and 40 millimeters, and, preferably, about 40 millimeters in length. While it is preferable to expose the photographic material by a continuous scanning procedure, the method of the present invention is also applicable to a single exposure of the entire paper.

The exposure of the photographic material is determined by standard photographic exposure techniques. The height of the table is preferably adjusted so that the intersection of the image beams corresponding to an object closest to the focal plane of the camera at the time the aerial photograph was made is positioned on the plane of the photosensitive material. If a mosaic is to be assembled from a plurality of anaglyphic photographs, the table is positioned for the image beam intersection of the highest terrain elevation of all photographs to be used. The adjustment is maintained throughout the exposure to keep every adjoining photograph, model, in a uniform perspective to eliminate an offset view when the mosaic is finally assembled.

Although both diapositives are being projected simultaneously, only that portion of each dispositive which is being projected at a given instant will be printed. This arrangement produces a final product on which each object point of the original stereo-pair of aerial photographs is imaged in two colours, green and red. These points are separated by an amount dependent upon their elevation.

In order to view the final product in three dimensions, it is necessary to wear a pair of glasses that match the colours that appear on the anaglyphic print. Each eye then sees the image formed from a different point of view and a three-dimensional orthophotograph is represented to the viewer.

In another embodiment of the present invention, a method for preparing a colour orthophotograph is provided. This method is similar to the anaglyphic method set forth above except that the red and green filters are removed and replaced by a set of gel filters each set having an equal value on each light source and containing a yellow and magenta filter. The value of each filter is established by that required by the negative and or diapositive to obtain an exposure with the proper colour rendition. Once the exposure is established, it will remain constant throughout the process unless a mosaic is to be provided wherein certain of the photographs were produced on different dates.

Further, instead of using a diapositive, a pair of aerial negatives were used. Preferably, the aerial negatives are positioned between a pair of clear glass plates to eliminate any film distortion. During the scanning of the colour sensitized photographic material, all objects are printed at their proper intersecting points to establish a completely rectified product. The colour orthophotograph complies in quality with United States mapping standards with faithful colour rendition.

An infrared colour orthophotograph can be prepared in the same manner except that infrared colour aerial film is taken in the positive form. This film should be transferred to a negative form for use in the same manner as the colour orthophotographs. Also, during scanning, all objects are printed at their proper intersecting points, e.g., ground level, to establish the rectified infrared orthophotograph.

Other advantages of the present invention will become apparent from a perusal of the following detailed description of a presently preferred embodiment taken in connection with the accompanying drawing.

BRIEF DESCRIPTION OF THE DRAWING

The accompanying drawing is a diagrammatic perspective view of the spatial relationships utilized during preparation of an anaglyphic orthophotograph pursuant to the methods of the present invention.

PRESENTLY PREFERRED EMBODIMENT

Referring to FIG. 1, a diagrammatic representation of the spatial relationships required in the preparation of anaglyphic orthophotographs of the present invention is shown. Means embodying the spatial relations shown diagrammatically are commercially available and are preferably employed in the method of the preferred embodiment to obtain the highest quality possible. It is clear, however, that method can be practiced without orthophotographic equipment of the optical and spatial relationships set forth hereinafter are folowed.

In preparing an anaglyphic orthophotograph, a pair of overlapping diapositive aerial photographs 11 and 12 are mounted on a pair of independently adjustable projection planes 13 and 14, respectively. Projection planes 13 and 14 preferably include mounting frames 16 and 17, respectively, upon which the diapositives are directly mounted. Mounting frames 16 and 17 include horizontal and vertical adjusting means (not shown) for correcting any variations between each of the aerial photographs caused by altitude or attitude differences of the aircraft during the original photographing for diapositives 11 and 12. Adjusting means 18 and 19 are provided to maintain a focal length corresponding with the focal length of the aerial camera used.

Positioned above plates 13 and 14 are a pair of high intensity light sources 21 and 22. Preferably, light sources 21 and 22 are quartz halide projecting lights to produce the required high intensity beams necessary to project corresponding portions of the diapositive onto a vertically adjustable plane, table 31, provided below projecting plates 13 and 14 containing the photosensitive paper. Mounted to the light sources and in the optical path of the beams produced thereby is a red filter 23 and a green filter 24, respectively. Because light sources 21 and 22 are of high intensity, an associated red light beam is projected through diapositive 11 and a green beam through diapositive 12. While red and green filters 23 and 24 are preferred because of the well-defined images provided thereby, other coloured filters may be used provided they produce the necessary image separation when exposed on the photosensitive material.

Respectively positioned below projecting planes 13 and 14 are lens means 26 and 27. Light sources 21 and 22 are centered on the optical axis of the associated lens. Lens means 26 and 27 are adapted to focus the associated red and green image beams emanating from projecting planes 13 and 14 onto table 31. Lens means 26 and 27 are positioned so that the two image beams intersect within the range of the vertically adjustable plane, table 31.

Table 31 is positioned below projecting planes 13 and 14 and is adjustable in the vertical, Z, plane by means of brine elevator adjustment means 32. Means 32 provides a vertical adjustment to table 31 while maintaining a horizontal planar position. Horizontal and vertical positioning of planes 13 and 14, to correct variations in diapositives 11 and 12 introduced by aircraft changes between takings, are made with respect to table 31. In the initial set-up of the process, the table is positioned at the vertical midpoint of means 32 so that the selected image beams can be focused to intersect at a point on the table.

A movable carriage means 33 is preferably included on table 31 and includes motor means (not shown) for moving the carriage along the length of the table. Movement of carriage 33 is in discrete increments equal to the width of exposure slot 34. Exposure slot 34 is mounted in cupel 36 which is adapted for horizontal movement in and along the longitudinal axis of carriage 33. Preferably, cupel 36 is motorized to provide a constant presettable speed for uniformly correct exposures.

Mounted to cupel 36 are a pair of spacer arms 37 and 38 which are attached to light sources 21 and 22, respectively. As cupel 36 moves along carriage 33, the projected first and second light beams from light sources 21 and 22 are directed through corresponding portions of diapositives 11 and 12 and through lenses 26 and 27 onto exposure slot 34. The projected image beams are therefore directed onto slot 34 during both incremental movement of carriage 33 and cupel 36.

Positioned on table 31 and underneath carriage 33 is a sheet of coloured photosensitive material (not shown). A mask 39 is provided over the photosensitive material which is attached to carrier 33 and, therefore, incrementally movable. Additional masks 41 are provided in carriage 33 attached to cupel 36 and movable therewith. Accordingly, the only light to reach the photosensitive material is that which passes through exposure slot 34.

In preparing the anaglyphic orthophotographs of the present invention, diapositives 11 and 12 are positioned on projecting planes 13 and 14 which are thereafter adjusted for any variations between the two photographs caused by variations in the aircraft at the time of taking. Preferably, the highest elevation of the terrain represented on the photographs is determined. If a mosaic is to be assembled from a number of individual anaglyphs, the highest terrain elevation represented by mosaic is preferably determined. While it is generally preferred to utilize the highest elevation or closest object point to the focal plane of the camera, it is also possible to utilize the lowest elevation or furtherest point. Where, however, there is a large relief, it is desirable to utilize a midpoint location or some other intermediate point in order to avoid large image separations. A direct-plotting instrument, or a floating mark, is used in viewing the projected images of the diapositives. However, in order to visually interpret a stereoscopic pair of projected images, a pair of coloured eye glasses of approximately the same colour value as filters 23 and 24 should be used.

By means of the direct-plotting instrument and table elevating means 32, table 31 is adjusted so that the light rays projected through image representing the highest or selected elevation intersect on the vertically adjustable plane of the photosensitive material or slightly above. Unlike normal orthophotographic methods, once this adjustment has been made, the table is maintained at that level throughout the exposure process.

In order to obtain a uniform exposure over the entire surface of the photosensitive material apodizing filters are positioned over diapositives 11 and 12. These filters provide a varying neutral colour intensity gradient from the center to the periphery. As in all photographic processes, a test is made to determine the correct exposure time which, in this case, determines the speed of cupel 36.

Once determined, carriage 33 is positioned at the leading edge of table 31 and cupel 36 at one end of carriage 33. On many orthophotographic units the length of exposure slot 34 may vary from 5 to 40 mm. Preferably, the longest exposure slot, 40 mm, is used in the preparation of the anaglyphs of the present invention.

Light sources 21 and 22 are turned on and cupel 36 is set in motion to traverse the length of carriage 33 (the width of table 31). Upon reaching the other end, carriage 33 is incrementally moved from its original position to a position approximately equal to the length of slot 34. Cupel 36 thereafter traverses the length of carriage 33 in the reverse direction. This is repeated until the entire colour photosensitive material is exposed. The exposed material is then developed in a conventional manner. While it is preferred to line scan expose the photosensitive material, it is also possible to expose the entire material at one time. Generally, an exposure of the entire image at one time would require a slight modification to light projector sources 21 and 22 to provide a high intensity over the entire surface. This method, however, is generally more advantageous where a standard orthophotographic unit is not available.

During the entire exposure process, the spatial intersection of the points of light rays issuing from the incremental areas of the diapositives projected onto table 31 are above the plane of the photosensitive material (where the highest elevation is used). Because the intersection of the light rays is below the plane of the photosensitive material, two images, red and green, are exposed upon the photosensitive paper separated by a distance directly proportional to the relative elevation of the images. Thus, the points of intersection of the image means on the photosensitive material correspond to the object elevation selected in positioning table 31.

It has been found that in the practice of the preferred embodiment with an apodizing filter, the exposed photosensitive paper will have a slight reddish cast along the edge that underlies diapositive 11 and a slight bluish cast along the edge that underlies diapositive 12. This is due to the fact that the intensity of the light is inversely proportional to the square of the distance from the respective light sources. While this represents no deterioration in the quality of a single anaglyphic orthophotograph, a plurality of anaglyphs assembled as a mosaic will provide discernible jointure lines. Accordingly, in a mosaic, adjacent photographs should be printed so that the edges of slight bluish cast adjoin each other while those of reddish cast adjoin each other. This can be achieved for example by switching the respective filters or rotating the adjoining model diapositives 180°.

By viewing the anaglyphs of the present invention through a pair of red and green filtered glasses, a scale rectified, three-dimensional orthophotograph is seen. Moreover, since both stereo images are printed simultaneously, with the proper image separation, the costs in preparing the anaglyphs are substantially the same as in conventional orthophotographic methods. No masking or offset techniques are involved to either increase the costs or to affect the accuracy of the final product.

In another embodiment of the invention, a method of preparing color orthophotographs is provided. This method is similar to that discussed above except with a number of important exceptions.

To prepare a colour orthophotograph, red and green filters 23 and 24 are replaced by a set of gel filters which are used to obtain the proper colour rendition. Both sets of filters are positioned in front of light sources 21 and 22 and have the same filter values, and each set includes a yellow and magenta filter. Also, rather than using diapositives, a pair of aerial colour negatives are used. A colour diapositive, however, can be used to prepare a rectified colour negative.

Test exposures on colour sensitive photographic material are made to determine the correct exposure time as well as filter values. These times and values are maintained throughout the exposure of the photosensitive material, unless a mosaic is to be assembled in which certain of the aerial photographs were taken on a different day or lighting condition. In that case, separate times and values are required to maintain a uniform colour balance for all prints in the mosaic.

Exposure of the colour sensitive material is carried out in the same manner as that for preparing an anaglyphic orthophotograph except that the height of table 31 is constantly adjusted to maintain the floating mark on apparent ground level. That is, the two image beams are superimposed with the aid of a stereoscopic viewing device to provide a three-dimensional image in the vertically adjustable plane. When proper image superposition is achieved, the two beams will intersect at a point below the vertically adjustable plane or table 31. Further, in the plane of table 31, the images are separated so that only one is used to print the photosensitive material. The other beam, used to achieve superposition, is not printed because of the mask.

Thus, during the exposure scan by the slot, both images are stereoscopically viewed on the vertically adjustable plane, only one of which is used to print, and the height of the plane or table 31 is continuously adjusted in the Z plane to maintain the mark at apparent ground level. In this manner a completely rectified colour orthophotograph is prepared. This method is also used in the preparation of infrared orthophotographs from infrared negatives.

While presently preferred embodiments of the invention have been described in particularity, it may otherwise be embodied within the scope of the appended claims.

What is claimed is:

1. A photogrammetric method for the preparation of an anaglyphic orthophotographic print from first and second diapositives having overlapping image areas of at least 55 to 65 percent, said method comprising:

A. positioning said first and second diapositives above a vertically adjustable plane in spaced apart relation and in a planar attitude corresponding to the attitude of the focal plane of the camera when taken;

B. projecting (i) a high intensity first coloured light beam through said first diapositive to generate a first image beam, (ii) a high intensity second colour light beam through said second diapositive to generate a second image beam;

C. focusing a selected image of said first and second image beams to intersect at a point; said image corresponding to a selected object distance from the focal plane of the camera at the time said diapositives were taken;

D. adjusting said vertically adjustable plane so that said point of intersection lies in said plane;

E. positioning colour photosensitive material in said plane and exposing said paper to said first and second image beams; and F. developing said exposed photosensitive material.

2. A method as set forth in claim 1 wherein said selected image is of an object closest to said focal plane.

3. A method as set forth in claim 1 wherein said selected image is of an object furtherest from said focal plane.

4. A method as set forth in claim 1 wherein said selected image is of an object spaced intermediate of the closest and furtherest objects to and from the focal plane.

5. A method as set forth in claim 1 wherein said first and second coloured light beams are red and green, respectively.

6. A method as set forth in claim 1 wherein said photosensitive material is exposed in segments.

7. A method for the preparation of an anaglyphic orthophotographic print from first and second diapositives having overlapping image areas of at least 55–65 percent, said method comprising:
  A. positioning said first and second diapositives above a vertically adjustable plane in spaced apart relation and in a planar attitude corresponding to the attitude of the focal plane when taken;
  B. placing a colour photosensitive material in said vertically adjustable plane and masking said paper;
  C. projecting (i) a high intensity first coloured beam through at least a portion of said first diapositive to generate a first image beam, (ii) a high intensity second coloured beam through at least a corresponding portion of said second image beam;
  D. focusing said first and second image beams to intersect at a point;
  E. adjusting said vertically adjustable plane so that said point of intersection lies in said plane only for the image on the diapositives corresponding to a selected object distance from the focal plane of the camera at the time said diapositives were taken;
  F. projecting said high intensity beams through corresponding adjacent portions of said diapositives and exposing adjacent portions of said photosensitive material to said image beams; and
  G. developing said exposed photosensitive material.

8. A method as set forth in claim 7 wherein said first coloured beam is red and said second coloured beam is green.

9. A method as set forth in claim 7 wherein said adjacent portions of photosensitive material are continuously exposed as strips.

10. A method as set forth in claim 7 wherein said selected object distance corresponds to the closest distance to the focal plane.

11. A method as set forth in claim 7 wherein said selected object distance corresponds to the furtherest distance from the focal plane.

12. A method as set forth in claim 7 wherein said selected object distance corresponds to an intermediate focal plane distance.

* * * * *